United States Patent
Schilling et al.

(10) Patent No.: US 8,286,566 B2
(45) Date of Patent: Oct. 16, 2012

(54) DOWN PRESSURE ADJUSTMENT ASSEMBLY FOR A DISC OPENER OF AN AGRICULTURAL IMPLEMENT

(75) Inventors: Robin B. Schilling, Darfield (CA); Matthew S. Naylor, Saskatoon (CA); Terrance A. Friggstad, Grasswood (CA)

(73) Assignee: CNH Canada, Ltd. (CA)

( * ) Notice: Subject to any disclaimer, the term of this patent is extended or adjusted under 35 U.S.C. 154(b) by 276 days.

(21) Appl. No.: 12/625,312

(22) Filed: Nov. 24, 2009

(65) Prior Publication Data

US 2011/0120357 A1    May 26, 2011

(51) Int. Cl.
  *A01B 5/00*   (2006.01)
  *A01B 61/00*  (2006.01)
  *A01C 5/00*   (2006.01)
  *A01C 7/00*   (2006.01)
  *A01C 9/00*   (2006.01)

(52) U.S. Cl. ........ 111/163; 111/164; 111/167; 111/186; 172/264; 172/599

(58) Field of Classification Search .......... 111/186–188, 111/163–170, 140, 14; 172/261, 263–268, 172/599
See application file for complete search history.

(56) References Cited

U.S. PATENT DOCUMENTS

| | | |
|---|---|---|
| 641,030 A | 1/1900 | Murray |
| 2,239,918 A | 4/1941 | Kriegbaum |
| 3,924,694 A | 12/1975 | Baughman et al. |
| 4,311,104 A | 1/1982 | Steilen et al. |
| 4,359,101 A | 11/1982 | Gagnon |
| 4,760,806 A | 8/1988 | Bigbee et al. |
| 4,846,084 A | 7/1989 | Sigle |
| 5,065,681 A | 11/1991 | Hadley |
| 5,685,245 A | 11/1997 | Bassett |
| 5,727,638 A | 3/1998 | Wodrich et al. |
| 5,906,166 A * | 5/1999 | Wagner ......................... 111/170 |
| 6,389,999 B1 | 5/2002 | Duello |
| 6,454,019 B1 | 9/2002 | Prairie et al. |
| 6,701,857 B1 | 3/2004 | Jensen et al. |
| 7,401,561 B1 | 7/2008 | Kurz |
| 7,640,874 B2 | 1/2010 | Hoehn |
| 2008/0029002 A1 | 2/2008 | Sulman |

FOREIGN PATENT DOCUMENTS

| | | |
|---|---|---|
| DE | 8412142 | 2/1985 |
| GB | 2091073 | 7/1982 |

* cited by examiner

*Primary Examiner* — Christopher J. Novosad
(74) *Attorney, Agent, or Firm* — Rebecca Henkel

(57) ABSTRACT

A down pressure adjustment assembly for a disc opener of an agricultural implement includes a rockshaft to which one or more disc opener units are mounted and an actuator that rotates the rockshaft. Rotation of the rockshaft causes the disc opener units to be raised or lowered. When the disc opener units are lowered into a field engagement position, further rotation of the rockshaft will cause compression of down pressure springs for each of the disc opener units.

9 Claims, 6 Drawing Sheets

DOWN PRESSURE ADJUSTMENT ASSEMBLY FOR A DISC OPENER OF AN AGRICULTURAL IMPLEMENT

BACKGROUND OF THE INVENTION

The present invention relates generally to ground opener units for an agricultural implement and, more particularly, to a down pressure adjustment assembly for setting the amount of down pressure placed on a disc opener unit. The invention is further directed to a down pressure adjustment assembly that may be used to raise and lower a number of disc opener units mounted to a common tool bar.

One type of planting implement is commonly equipped with one or more rows of discs or coulters carried by one or more tool bars, commonly referred to as a disc drill, which is towed by a tractor or other prime mover. Typically, an air cart, which holds seed and/or fertilizer, is also towed by the tractor and pneumatically supplies the individual disc openers with seed and/or fertilizer. The disc openers are attached to the disc drill frame by individualized arms or linkages which allow the disc openers to operate independently of one another. This "independence" allows the discs to independently respond to changes in terrain and field obstructions.

Each disc has a generally flat construction that is rotated a few degrees, e.g., 7 degrees, about a vertical axis so that as the disc is pulled through the soil the leading surface of the disc displaces soil and creates a furrow in the soil. Downward pressure on the disc is provided by a spring or hydraulic cylinder to hold the disc at a desired furrowing depth, e.g., desired seeding depth. The depth at which the disc cuts the furrow into the soil is usually controlled by a gauge wheel that runs in relative close proximity to the disc. In addition to its depth controlling function, for some disc drills, the placement of the gauge wheel close to the disc also assists in keeping the disc surface clean of soil, mud, and other debris buildup. Also, the gauge wheel rides over the soil displaced by the disc as the furrow is being cut to prevent the displaced soil from being thrown.

The disc cuts a furrow or trench in the soil into which seed and/or fertilizer is deposited. The seed and/or fertilizer is dropped through a tube into the trench. The disc holds the trench open on one side and a disc scraper blade holds it open on the opposite side. The trench walls then collapse onto the seed and/or fertilizer when the disc and scraper blade pass. A trailing wheel then packs the soil atop the seed and/or fertilizer. Most disc drills include a spring that is used to adjust the amount of packing pressure applied by the trailing (packer) wheel.

A conventional disc drill will include a lift assembly for lifting and lowering the disc opener unit. These lift assemblies may also be used to set a downward pressure on the disc opener units. For disc opener units that are not coupled to the tool bar with a parallel linkage, it is possible for the disc opener unit to tip up or tip down as the down pressure is adjusted.

SUMMARY OF THE INVENTION

The present invention is directed to a down pressure adjustment assembly for use with a disc opener unit having a trailing-type disc opener. The down pressure adjustment assembly includes a rockshaft and actuator that are designed to raise and lower the disc opener unit (or a plurality of disc opener units) as desired. The down pressure adjustment assembly may also be used to adjust the amount of down pressure that is applied to the disc or coulter that is used to cut a furrow into the planting surface.

The present invention is particularly well suited for use with disc opener units having parallel links to mount the disc opener unit to a tool bar. Parallel linkages are commonly used to mount a disc opener to a tool bar because such linkages are effective in keeping the disc, seed tube, scraper plate, trailing packer wheel, etc. at constant relative positions as the disc opener unit is pulled through the planting surface. Such parallel linkages are particularly advantageous for disc openers equipped with a separate seed tube that is positioned aft of the disc and a fertilizer tube.

It is an object of the invention to provide an assembly that can be used to raise and lower disc opener units mounted to a common tool bar of an agricultural implement.

It is another object of the invention to provide a down pressure adjustment assembly for a disc opener unit that is coupled to a tool bar by a parallel linkage arrangement.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
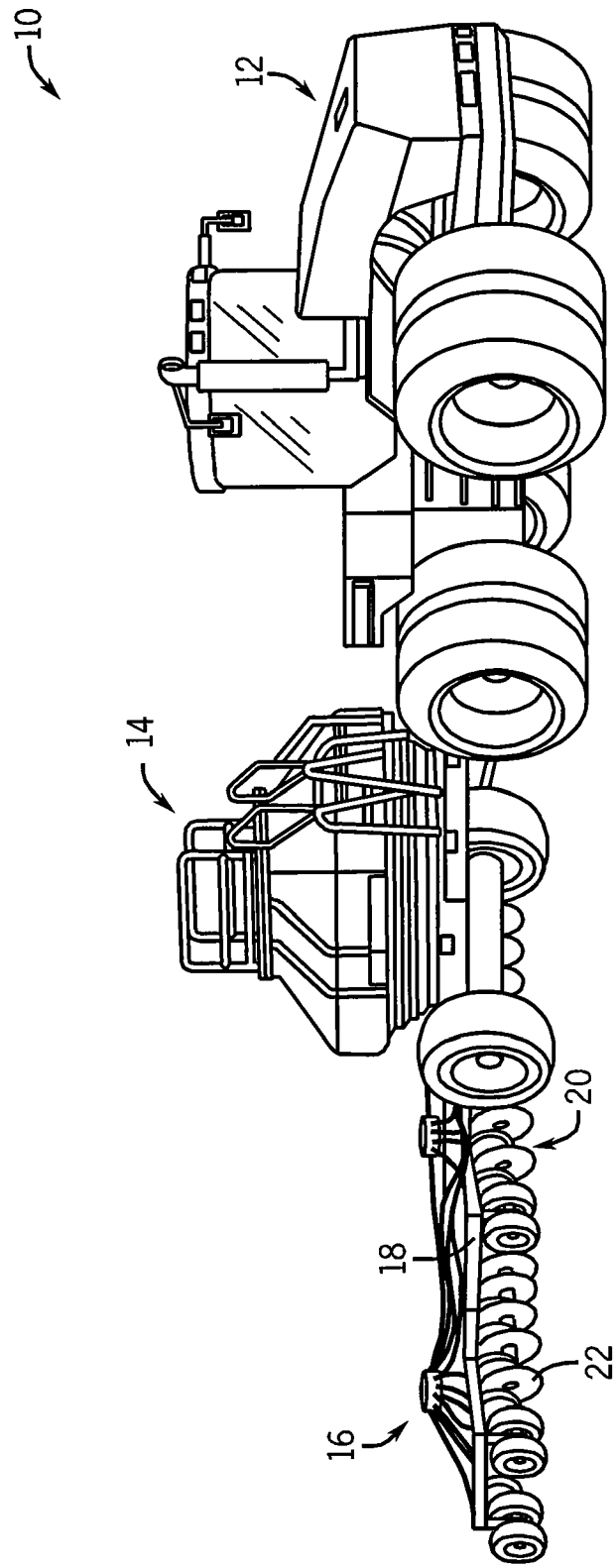
FIG. 1 is a pictorial view of an agricultural system generally comprised of tractor, an air cart, and a disc drill having a set of disc openers.

Referring now to the drawings, and more particularly to FIG. 1, an agricultural seeding system 10 is shown and, as known in the art, is generally comprised of a tractor 12, an air cart 14, and a seeder 16. The air cart 14 and the seeder 16 are hitched to the tractor 12 in a conventional manner. The seeder 16 includes a tool bar 18 to which a set of disc opener units 20 are coupled. The disc opener units 20 each include a disc 22 designed to cut a furrow into the soil. As known in the art, the air cart 14 pneumatically delivers seed and/or fertilizer to a set of delivery tubes (not shown) of the seeder 14 whereupon the seed and/or fertilizer is deposited in seed trenches or furrows cut by the discs 22.

Figure 2:
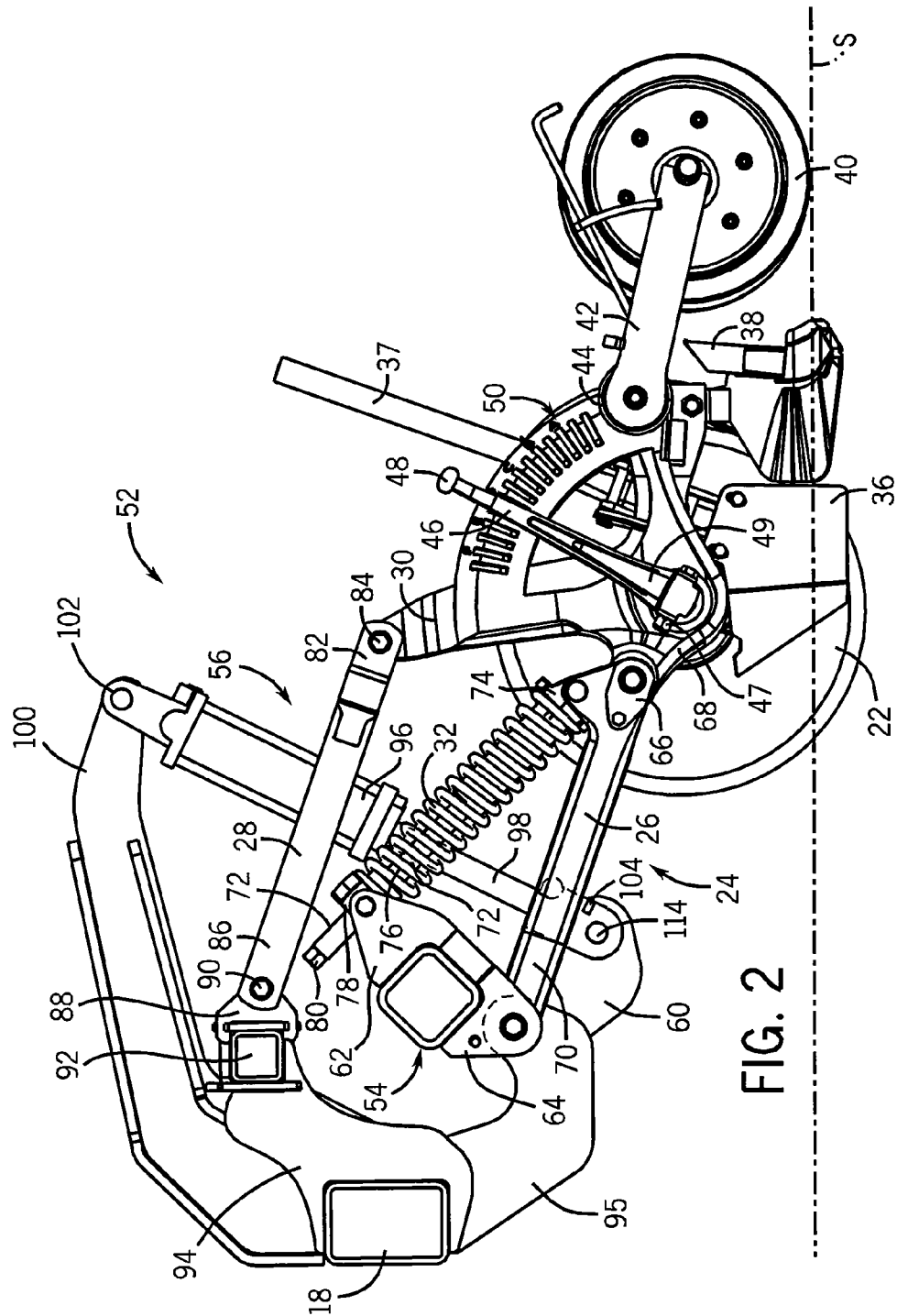
FIG. 2 is a side elevation view of a disc opener unit of the disc drill of FIG. 1 in a ground engaging position.

An exemplary disc opener unit 20 is shown in FIG. 2. Each disc opener unit 20 includes a linkage assembly 24 that in the illustrated unit includes links 26, 28 that are coupled to the tool bar 18 in a known manner at one end, and connected to an opener frame 30 at the opposite end. The opener unit 20 includes a spring 32 that applies downward pressure on the disc 22. Alternately, a hydraulic cylinder may be used to apply such downward pressure. Disc penetration is controlled by a gauge wheel 34, FIG. 6, that is positioned in relative close proximity to the disc 22. In addition to controlling the penetration depth of the disc 22 the gauge wheel 34 also helps in keeping the adjacent side of the disc 22 clear of debris. A scraper blade 36 is provided on the opposite side of the disc 22 to keep the trailing face of the disc 22 clear of soil, mud, and debris. In one preferred embodiment, the disc 22 is angled at an offset of approximately 7 degrees from vertical; although, different orientations are contemplated. The leading side of the disc 22 displaces soil and creates a furrow in the soil as the disc 22 is pulled through the soil by the tractor 12. In addition to providing a scraping function the scraper blade 36 also helps to hold the furrow open as seed and/or fertilizer is deposited into the furrow. The disc opener unit 20 includes a seed/fertilizer tube 37 that is flow-coupled to a seed/fertilizer source and drops seed/fertilizer into the furrow, as desired.

The disc opener unit 20 may also include a seed tube or boot 38 rearward of the fertilizer tube 37 that is flow-coupled to the air cart 14. As known in the art, seed and/or fertilizer is provided to the seed tube 38 which drops the seed and/or fertilizer into the furrow. A trailing wheel 40, coupled to the frame 30 by arm 42, packs the furrow after the seed and/or fertilizer has been deposited. The amount of packing pressure applied by the trailing wheel 40 is controlled by a spring 44; although, it is contemplated that other types of biasing devices may be used.

As noted above, the gauge wheel 34 controls the penetration depth of the disc 22. The gauge wheel 34 may raised or lowered by rotation of a depth adjustment arm 46. Arm 46, which includes a handle 48, may be rotated by a user pulling outward on arm 46 and then rotating the arm 46 to a desired position. The arm 46 is pivotably coupled to a spindle (not shown) by pin 47 that allows the arm 46 to be hinged away from the frame 30 to free the arm 46 to be rotated. Additionally, a flat spring 49 is preferably used to bias the arm 46 toward the frame. The bias of the flat spring 49 holds the arm 46 in engagement with the frame 30. The frame 30 includes an arc of notches 50 that define a range of discrete engagement points at which the arm 46 may be positioned. In one preferred embodiment, the notches 50 allow the gauge wheel 34 to set the penetration depth between 3.2 mm and 87 mm.

Figure 4:
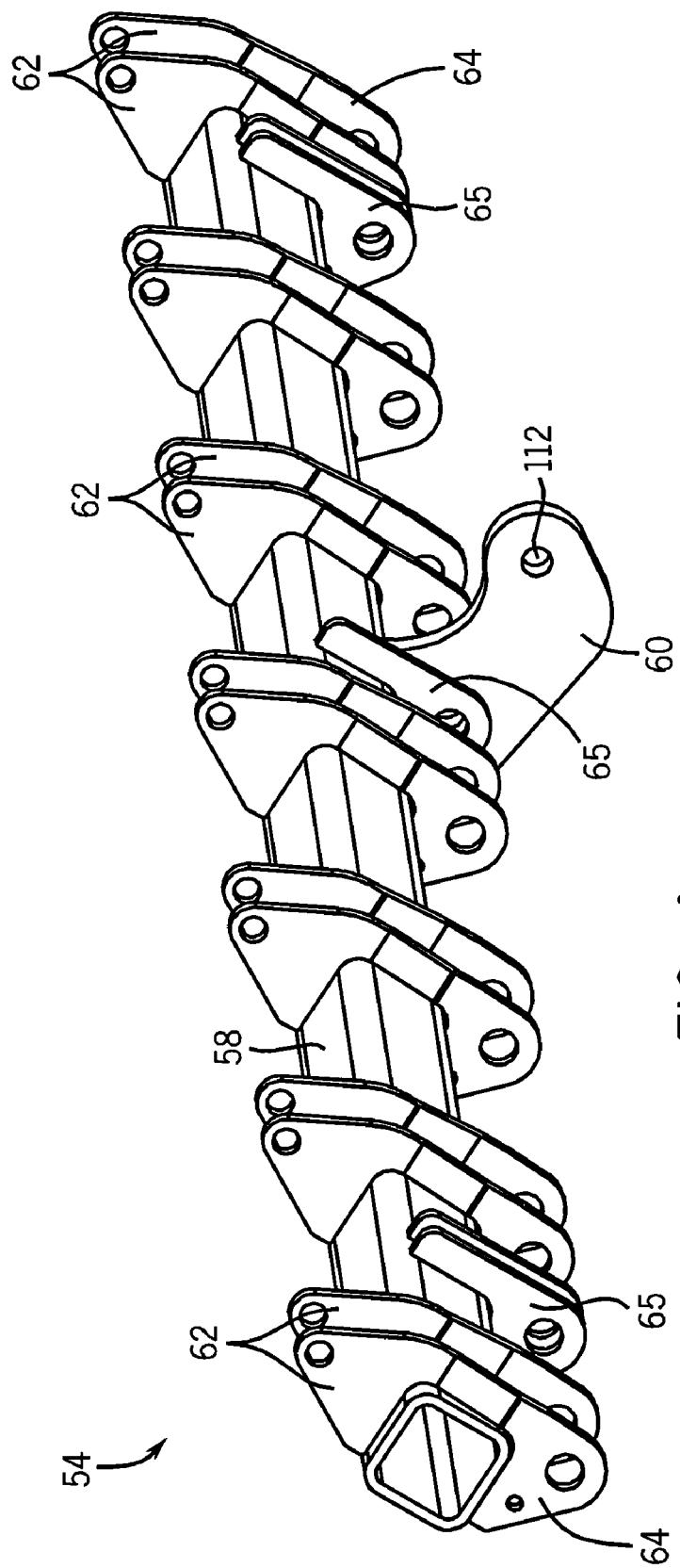
FIG. 4 is an isometric view of a rockshaft of the disc drill.

The present invention further provides a down pressure adjustment assembly 52 that is generally comprised of a rockshaft 54 and an actuator 56. With additional reference to FIG. 4, the rockshaft 54 has an elongated body 58 and a series of arms defined along the length of the body 58. More particularly, the arms include a cylinder mount arm 60, spring trunnion rocker arms 62, rockshaft pivot arms 64, and tool bar mount arms 65. Referring back to FIG. 2, lower link 26 has an opener end 66 that is coupled to a lower end 68 of frame 30. Opposite end 66 is a rockshaft end 70 that is coupled to a pivot arm 64 of the rockshaft 54. As also shown in FIG. 2, spring 32 loops around a shaft 72 having a first end 74 coupled to the opener end 66 of the lower link 26 and a second end 76 that passes through a trunnion 78. The trunnion 78 is coupled to a trunnion rocker arm 62 of the rockshaft 54. The trunnion 78 is secured on the shaft 72 by a bolt 80 that is threaded onto the end of the shaft 72 extending through the trunnion 78. As will be explained further herein, the spring 32 can be compressed along the shaft 72 toward end 74 as the trunnion 78 is moved toward end 78 of the shaft 72.

The upper link 28 also has an opener end 82 that is pivotably coupled to frame 30 by pivot pin 84 and a tool bar end 86 that is pivotably coupled to a bracket 88 by pin 90. The bracket 88 is coupled to a header tube (or bar) 92 that is coupled to an upper arm 94 that extends from the tool bar 18. A lower arm 95 also extends from the tool bar 18 and the rockshaft 54 is pinned to the lower arm 95 at mounting arms 65. This coupling of the tool bar 18 to the rockshaft 54 defines the axis about which the rockshaft 54 pivots in response to movement of the actuator 56, as is further described below. It will be appreciated that the coupling of the lower link 26 to the rockshaft 54 allows the rockshaft 42 to rotate or pivot relative to the lower link 26. Similarly, the coupling of the upper link 28 to the header tube 92 allows the upper link to pivot or rotate relative to the header tube 92. The lower and upper links are also free to pivot or rotate relative to the disc opener frame 30. These multiple pivot joints are intended to maintain the upper and lower links in a generally parallel relationship even as the rockshaft 54 is rotated by actuator 56.

Figure 5:
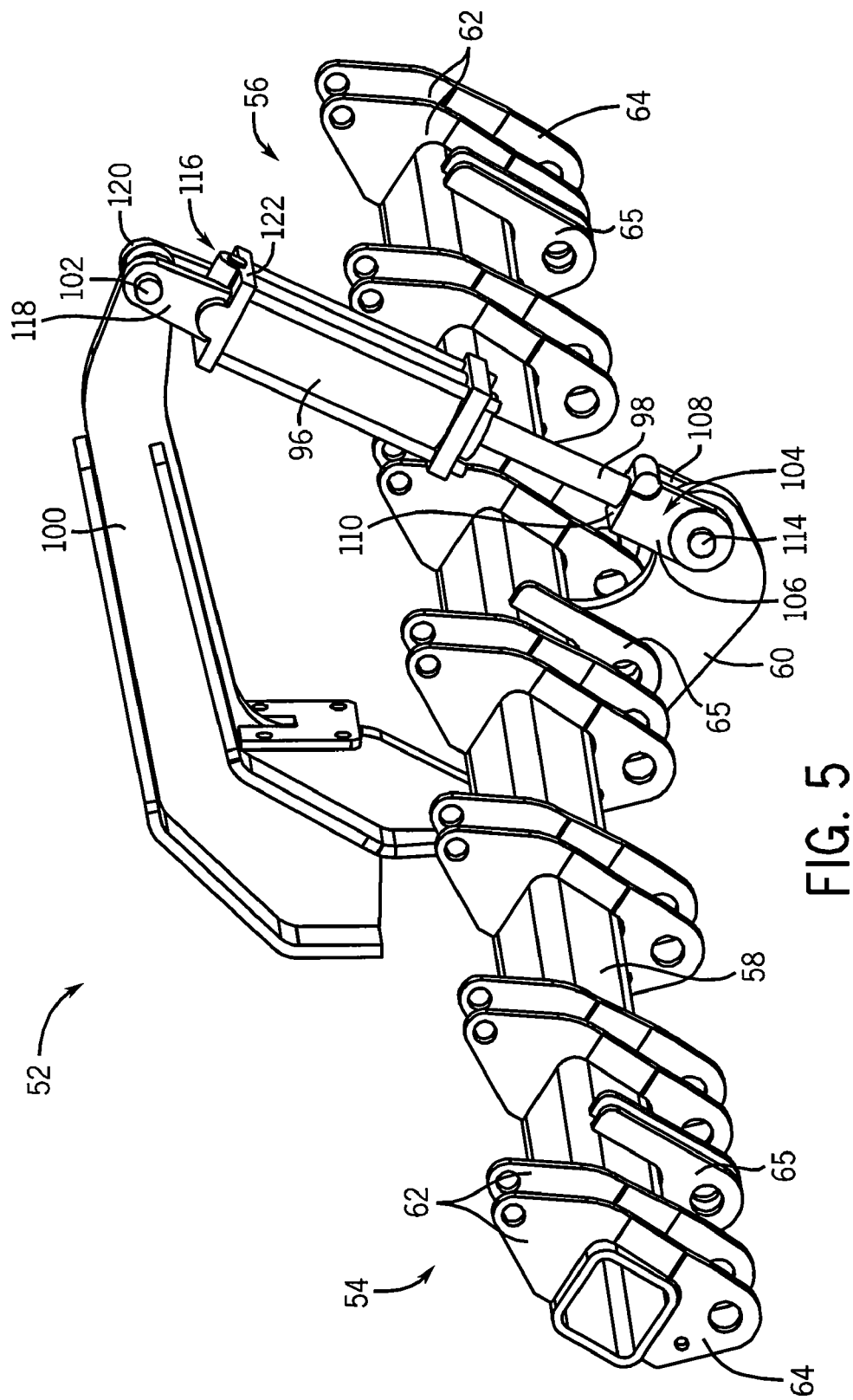
FIG. 5 is an isometric view of the rockshaft of FIG. 4 with an actuator coupled to the rockshaft.

With additional reference to FIG. 5, the actuator 56 includes a cylinder 96 having an extendible rod 98. The cylinder 96 is pivotably coupled to a cylinder support arm 100 by a pivot pin 102 and the rod 98 is pivotably coupled to the cylinder mount arm 60 of the rockshaft 54. More particularly, with reference to FIGS. 4 and 5, a bracket 104 is secured to the distal end of the rod 98, and includes a pair of flanges 106, 108 that are spaced from one another yet connected by a bridge member 110. Openings (not shown) are formed in the flanges and align with opening 112 of the cylinder mount arm 60, FIG. 4. A pin 114 may then be passed through the openings and a cotter pin or similar fastener (not shown) may then be used to secure the pin in place. This loose retention of the pin 114 allows the bracket 104 to pivot or rotate about the pin 114.

In a similar fashion, a bracket 116 is secured to the cylinder 96 and includes a pair of generally upright flanges 118, 120 spaced apart yet connected to one another by a bridge member 122. Openings (not shown) are formed in the flanges 118, 120 and align with opening (not shown) of the actuator support arm 100. Pin 102 extends through the openings and a cotter pin or similar fastener (not shown) secures the pin 102 in place. This loose retention of the pin 102 allows the bracket 116, and thus cylinder 96, to pivot or rotate about the pin 102. The actuator support arm 100 mounts to the tool bar 18 and extends aft of the tool bar 18.

Figure 3:
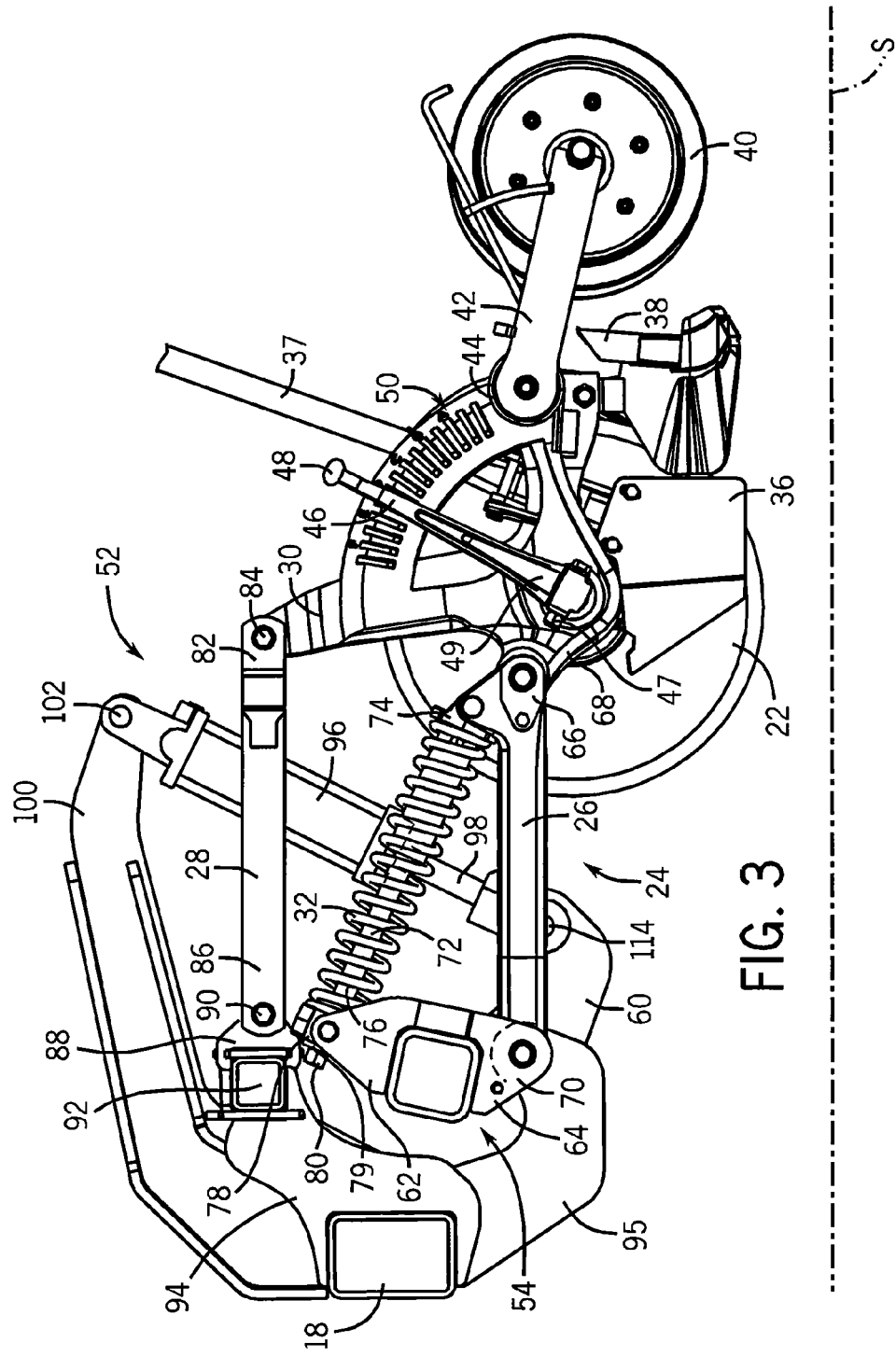
FIG. 3 is a side elevation of the disc opener unit of FIG. 2 in raised transport position.
Figure 6:
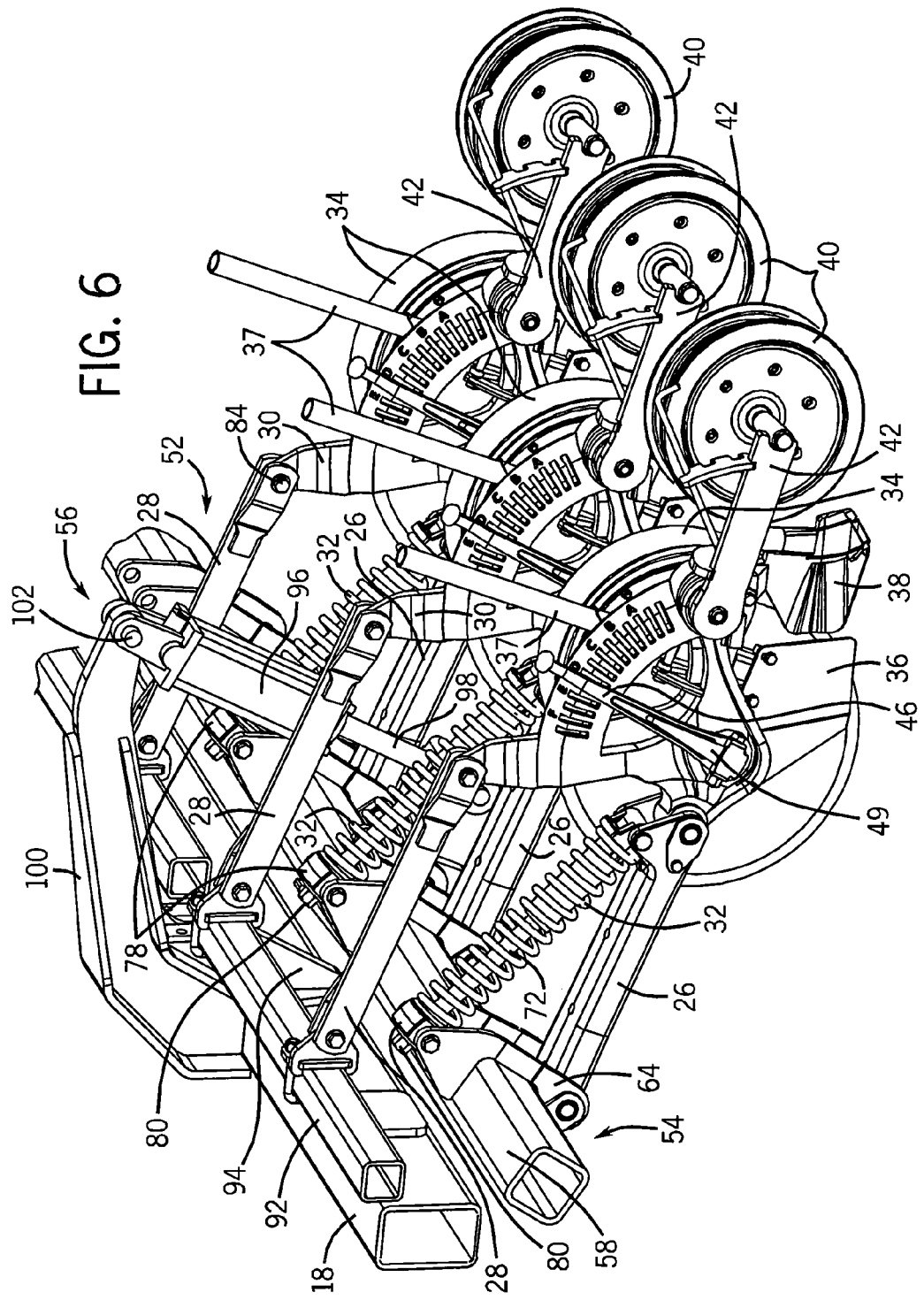
FIG. 6 is an isometric view of a portion of the disc drill of FIG. 1 with three disc opener units shown in a lowered ground engaging position.

Reference will now be made to FIGS. 2 and 3. As described above, the present invention provides a rockshaft 54 and an actuator 56 designed to rotate the rockshaft 54, which causes a set of disc openers to be lowered and raised in unison. FIGS. 2 and 6 show a set of disc opener units in a lowered ground engaging position. FIG. 3 shows a single disc opener unit in a raised transport position.

When the rod 98 is extended, the rockshaft 54 is rotated toward the disc opener frame 30 (clockwise in FIG. 2). As the rockshaft 54 rotates in this clockwise direction, the trunnion rocker arms 62 and the pivot arms 64 follow rotation of the rockshaft 54 in the clockwise direction. As a result, the lower link 26 is pushed downward so as to lower the disc opener unit 10. It is noted that the upper link 28 pivots about pin 90 to follow the motion of the lower link 26 to lower the disc opener unit and maintain the parallelism of the links 26, 28. Preferably, the rockshaft 54 is rotated by the actuator 56 until the disc opener unit engages the planting surface S. At this point, further extension of the ram 98 and thus further clockwise rotation of the rockshaft 54 causes the spring trunnion 78 to slide along shaft 72 and further compress the spring 32. As the rockshaft 54 is rotated, the shaft 72 will begin to extend past the spring 32, as shown in FIG. 2. It will therefore be appreciated that the harder the soil or the deeper the seed placement, the greater the rotation of the rockshaft 54 that will be required.

Conversely, when the ram 98 is retracted, the rockshaft will be caused to rotate in a forward direction (counter-clockwise direction in FIGS. 3 and 6). As such, the rockshaft 54 will lift the lower link 26 so as to raise the disc opener unit 10. The upper link 28 pivots about pins 84 and 90 to follow the motion of the lower link 26 to maintain the aforementioned parallelism therebetween. As shown in FIGS. 3 and 6, when the ram 98 is retracted to raise the disc opener unit, the compression of the spring 32 is relaxed relative to the compression of the spring 32 in the in-use lowered position of FIG. 2. In a preferred embodiment, the ram 98 is fully retracted within cylinder 96 to lift the disc opener units into a transport position. It is understood however, that less than full retraction may be used to reduce the amount of down pressure applied by spring 32.

In a preferred embodiment as shown in FIG. 6, a single rockshaft 54 is used for all of the disc opener units of a single row of the disc drill and that a single actuator 56 is used to rotate the rockshaft 54. In another embodiment, a single actuator 56 is used to raise and lower a split rockshaft. In such an embodiment, the rockshaft is comprised of two half-tubes, with each half-shaft mounted to a respective flange of the rod mounting bracket 104. This alternate embodiment allows the rod 98 of the actuator 56 to effectively "pass through" the split rockshaft, which provides greater flexibility in the mounting of the actuator 56 and provides for lower torque. It is further contemplated that an additional support member (not shown) with an additional pivot (not shown) could be used near the actuator mounting to the rockshaft. The additional support member and pivot limits deflection of the rockshaft as the rockshaft is rotated. It is believed that such an arrangement is particularly well suited for disc drills in which four or more disc opener units are positioned at each side of the actuator 56.

It will therefore be appreciated that the present invention provides an improved down pressure assembly for a set of disc opener units that are mounted to a common tool bar using parallel linkage arrangements. The invention provides such an assembly without significantly adding to the size of the disc drill and therefore provides improved operability without sacrificing the compactness of the disc opener units.

Many changes and modifications could be made to the invention without departing from the spirit thereof. The scope of these changes will become apparent from the appended claims.

We claim:

1. A ground opener unit for an agricultural implement, comprising:
   an accessory bracket having a disc opener mounted thereto;
   a rockshaft configured to be pivotably coupled to a tool bar, the rockshaft having first and second opposite sides;
   a spring trunnion arm projecting from the first side of the rockshaft;
   a rockshaft pivot arm projecting from the second side of the rockshaft;
   an actuator mount arm projecting from the second side of the rockshaft;
   a parallel linkage coupling the accessory bracket to the tool bar of the implement, the parallel linkage having an upper link pivotably connected to the tool bar and a lower link pivotably connected to the rockshaft pivot arm;
   a down pressure device having a first end coupled to the spring trunnion arm and a second end coupled to the accessory bracket; and
   an actuator having a first end pivotably connected to a support arm of the agricultural implement and a second end pivotably connected to the actuator mount arm, wherein actuation of the actuator is operative to rotate the rockshaft to raise and lower the ground opener unit.

2. The ground opener unit of claim 1 wherein the actuator is a cylinder having a ram, and wherein the cylinder is coupled to the actuator support arm and the ram is coupled to the actuator mount arm of the rockshaft.

3. The ground opener unit of claim 1 wherein the down pressure device includes a spring.

4. The ground opener unit of claim 3 further comprising a sleeve having a first end coupled to the spring trunnion rocker arm and a second end coupled to the accessory bracket, and wherein the sleeve passes through the spring.

5. The ground opener unit of claim 1 wherein the rockshaft is positioned in a space between the upper link and the lower link.

6. The ground opener unit of claim 1 wherein the upper link has a first end pivotably coupled to the tool bar and a second end pivotably coupled to the accessory bracket and the lower link has a first end pivotably coupled to the rockshaft pivot arm and a second end pivotably coupled to the accessory bracket.

7. The ground opener unit of claim 1 further comprising a fertilizer boot mounted to the accessory bracket and a seed boot spaced from and rearward of the fertilizer boot mounted to the accessory bracket.

8. The ground opener unit of claim 7 wherein the down pressure device includes a spring.

9. The ground opener unit of claim 7 wherein the upper link has a first end pivotably coupled to the tool bar and a second end pivotably coupled to the accessory bracket and the lower link has a first end pivotably coupled to the rockshaft pivot arm and a second end pivotably coupled to the accessory bracket.

* * * * *